United States Patent
Takamura

(10) Patent No.: US 11,808,349 B2
(45) Date of Patent: Nov. 7, 2023

(54) CONTROL DEVICE AND CONTROL METHOD FOR AUTOMATIC TRANSMISSION, AND NON-TRANSITORY COMPUTER-READABLE MEDIUM

(71) Applicants: JATCO Ltd, Fuji (JP); NISSAN MOTOR CO., LTD., Yokohama (JP)

(72) Inventor: Takuya Takamura, Fuji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/639,216

(22) PCT Filed: Oct. 2, 2020

(86) PCT No.: PCT/JP2020/037630
§ 371 (c)(1),
(2) Date: Feb. 28, 2022

(87) PCT Pub. No.: WO2021/070759
PCT Pub. Date: Apr. 15, 2021

(65) Prior Publication Data
US 2022/0299109 A1    Sep. 22, 2022

(30) Foreign Application Priority Data
Oct. 9, 2019 (JP) ................................. 2019-185706

(51) Int. Cl.
| F16H 59/70 | (2006.01) |
| F16H 61/30 | (2006.01) |
| F16H 61/686 | (2006.01) |
| F16H 61/28 | (2006.01) |

(52) U.S. Cl.
CPC ............. F16H 61/30 (2013.01); F16H 59/70 (2013.01); F16H 61/686 (2013.01); *F16H 2059/706* (2013.01); *F16H 2061/2853* (2013.01)

(58) Field of Classification Search
CPC .... F16H 59/70; F16H 2059/706; F16H 61/30; F16H 61/686; F16H 2061/2853
See application file for complete search history.

(56) References Cited

U.S. PATENT DOCUMENTS

| 5,749,802 | A | * | 5/1998 | Tanahashi | ........... F16H 61/0437 475/120 |
| 2002/0013647 | A1 | * | 1/2002 | Kawazoe | .............. B60W 30/12 180/443 |
| 2011/0028273 | A1 | * | 2/2011 | Deishi | ................. F16H 61/0251 477/115 |
| 2012/0323457 | A1 | * | 12/2012 | Nakamura | ........ F16H 61/66272 701/59 |
| 2018/0106368 | A1 | | 4/2018 | Tasaka et al. | |

FOREIGN PATENT DOCUMENTS

WO    WO-2016/152329 A1    9/2016

* cited by examiner

*Primary Examiner* — Edwin A Young
(74) *Attorney, Agent, or Firm* — Foley & Lardner LLP

(57) ABSTRACT

The control device is configured to supply an offset current value to disengagement solenoids of disengagement-side friction engaging elements among a plurality of shift solenoids that control respective shift oil pressures applied to the plurality of friction engaging elements, and when a current gear position is a first speed position or a reverse position, decrease a current value to be supplied to at least one of the disengagement solenoids that are supplied with the offset current value to be lower than the offset current value.

9 Claims, 10 Drawing Sheets

ENGAGEMENT TABLE

| NUMBER OF GEAR POSITION | B1 | B2 | B3 | K1 | K2 | K3 |
|---|---|---|---|---|---|---|
| 1 |  | ● | ● |  |  | ● |
| 2 |  | ● |  |  | ● | ● |
| 3 |  | ● | ● |  | ● |  |
| 4 |  | ● | ● | ● |  |  |
| 5 |  |  | ● | ● | ● |  |
| 6 |  |  |  | ● | ● | ● |
| 7 |  |  | ● | ● |  | ● |
| 8 | ● |  |  | ● |  | ● |
| 9 | ● |  | ● | ● |  |  |
| Rev | ● | ● | ● |  |  |  |
| N RANGE, P RANGE |  |  |  |  |  |  |

*FIG. 3*

ENGAGEMENT TABLE

| NUMBER OF GEAR POSITION | B1 | B2 | B3 | K1 | K2 | K3 |
|---|---|---|---|---|---|---|
| 1 | ☐ | ● | ● | ☐ | | ● |
| 2 | | ● | ● | | ● | ● |
| 3 | | ● | ● | | ● | |
| 4 | | ● | ● | ● | | |
| 5 | | ● | ● | ● | ● | |
| 6 | | | | ● | ● | ● |
| 7 | | | ● | ● | | ● |
| 8 | ● | | | ● | | ● |
| 9 | ● | | ● | ● | | |
| Rev | ● | ● | ● | | | |
| N RANGE, P RANGE | | | | | | |

*FIG. 8*

ENGAGEMENT TABLE

| NUMBER OF GEAR POSITION | B1 | B2 | B3 | K1 | K2 | K3 |
|---|---|---|---|---|---|---|
| 1 | | ● | ● | | | ● |
| 2 | | ● | ● | | ● | ● |
| 3 | | ● | ● | | ● | |
| 4 | | ● | ● | ● | | |
| 5 | | | ● | ● | ● | |
| 6 | | | | ● | ● | ● |
| 7 | | | ● | ● | | ● |
| 8 | ● | | | ● | | ● |
| 9 | ● | | ● | ● | | |
| Rev | ● | ● | ● | ☐ | ☐ | |
| N RANGE, P RANGE | | | | | | |

*FIG. 9*

CONTROL DEVICE AND CONTROL METHOD FOR AUTOMATIC TRANSMISSION, AND NON-TRANSITORY COMPUTER-READABLE MEDIUM

TECHNICAL FIELD

The present invention relates to a control of an automatic transmission to be mounted on a vehicle.

BACKGROUND ART

As a failure determination device for a vehicle automatic transmission, there is known a device including: a monitoring unit for monitoring a current value to be supplied to a solenoid valve; an electrical abnormality detection unit for detecting an occurrence of an electrical abnormality in the solenoid valve based on that a monitored current value is different from an instruction current value supplied to the solenoid valve; a first abnormality determination unit for determining, after an electrical abnormality is detected, whether the solenoid valve has a short-circuit fault abnormality or a disconnection abnormality based on a selected gear position and a state of a transmission mechanism; and a second abnormality determination unit for determining, after the electrical abnormality is detected, whether the solenoid valve has a short-circuit fault abnormality or a disconnection abnormality based on the monitored current value when the solenoid valve is turned off (see WO2016/152329).

SUMMARY OF INVENTION

In the above-mentioned device in the related art, since a disconnection or the like cannot be diagnosed if no current is supplied at all when the solenoid valve is set to a turned off state, it is conceivable to supply a current for diagnosis even in the turned off state. However, as the number of friction engaging elements increases when the number of gear positions of automatic transmissions increases, an amount of current to be supplied to a shift solenoid increases accordingly. Therefore, there is a problem that as the number of gear positions increases, total current consumption which is a sum of currents supplied to all of the shift solenoids increases, which leads to an increase in a solenoid load on a transmission control unit.

The invention is made in view of the above-mentioned problem, and an object of the invention is to reduce the solenoid load of the transmission control unit while suppressing deterioration of a disconnection diagnosis function of the shift solenoid when the number of gear positions of the automatic transmission is increased.

To solve the above problem, according to an aspect of the present invention, a control device for an automatic transmission, includes a transmission control unit configured to control an engagement/disengagement state of each of a plurality of friction engaging elements in a gear train of the automatic transmission, so as to set a plurality of gear positions. The transmission control unit includes a solenoid management controller configured to supply an offset current value to disengagement solenoids of disengagement-side friction engaging elements among a plurality of shift solenoids that control respective shift oil pressures applied to the plurality of friction engaging elements. The solenoid management controller is configured to, when a sum of current values to be supplied to the plurality of shift solenoids exceeds a predetermined value, decrease a current value to be supplied to at least one of the disengagement solenoids that are supplied with the offset current value to be lower than the offset current value.

According to the above aspect, since the above mentioned means for solving the problem is adopted, a solenoid load of the transmission control unit can be reduced while suppressing deterioration of the disconnection diagnosis function of the shift solenoids when the number of gear positions of the automatic transmission is increased.

BRIEF DESCRIPTION OF DRAWINGS

FIG. 3 is an engagement table showing engaged states of friction engaging elements for shifting in the automatic transmission at each gear position.

FIG. 8 is an engagement table showing selections of disengagement solenoids for setting an offset current value Imin to zero when the automatic transmission is in a first speed position.

FIG. 9 is an engagement table showing selections of disengagement solenoids for setting the offset current value Imin to zero when the automatic transmission is in a reverse position.

DESCRIPTION OF EMBODIMENTS

Figure 1:
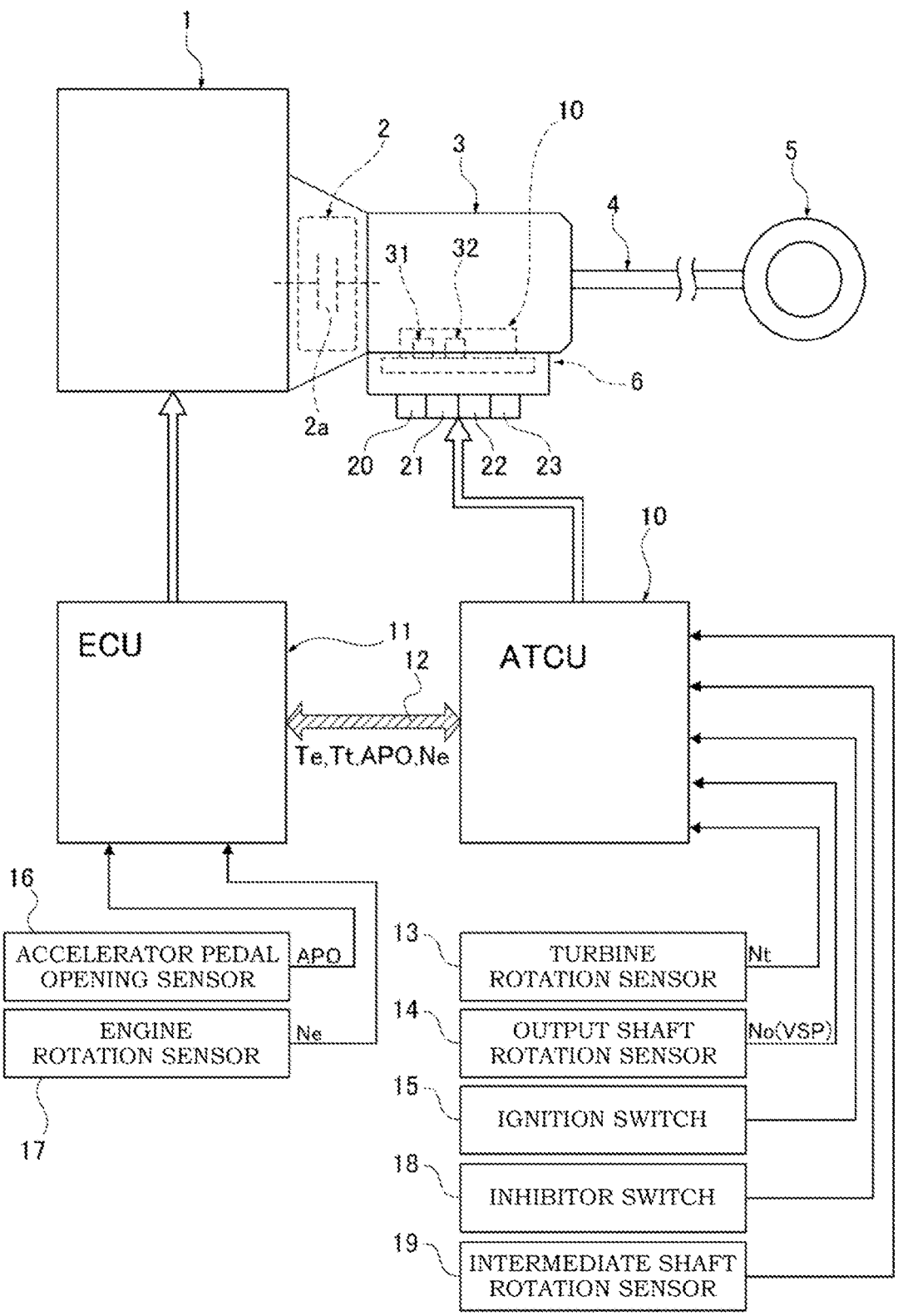
FIG. 1 is an overall system diagram showing an engine vehicle provided with an automatic transmission to which a control device of a first embodiment is applied.

Hereinafter, a control device for an automatic transmission according to an embodiment of the invention will be described with reference to the first embodiment shown in the drawings.

First Embodiment

The control device in the first embodiment is applied to an engine vehicle (an example of a vehicle) provided with an automatic transmission having gear positions including nine forward speeds and one reverse speed. Hereinafter, a configuration of the first embodiment will be described separately as "Overall System Configuration," "Detailed Configuration of Automatic Transmission," "Detailed Configuration of Hydraulic Control System," "Detailed Configuration of Electronic Control System," and "Configuration of Solenoid Current Limit Control Process".

[Overall System Configuration]

FIG. 1 is an overall system diagram showing an engine vehicle provided with an automatic transmission to which a control device of the first embodiment is applied. Hereinafter, the overall system configuration will be described with reference to FIG. 1.

As shown in FIG. 1, a driving system of the engine vehicle includes an engine 1, a torque converter 2, an automatic transmission 3, a propeller shaft 4, and a driving wheel 5. The torque converter 2 is provided with a built-in lock-up clutch 2a that directly connects a crankshaft of the engine 1 and an input shaft IN of the automatic transmission 3 by engagement. The automatic transmission 3 is provided with a control valve unit 6 consisting of spool valves, a hydraulic control circuit, hydraulic solenoid valves (hereinafter, referred to as a "hydraulic solenoids"), and the like for shift.

The control valve unit 6 includes, as the hydraulic solenoids, six clutch solenoids 20 (shift solenoids) provided for each friction engaging element, one line pressure solenoid 21, one lubrication solenoid 22, and one lock-up solenoid 23. That is, the control valve unit 6 includes a total of nine hydraulic solenoids. Each of these hydraulic solenoids has a three-way linear solenoid structure, and operates in response to a control command from a transmission control unit 10.

As shown in FIG. 1, an electronic control system of the engine vehicle includes the transmission control unit 10 (abbreviated as "ATCU"), an engine control unit 11 (abbreviated as "ECU"), and a CAN communication line 12.

Here, the transmission control unit 10 is mechanically and electrically integrally provided on an upper surface of the control valve unit 6. The transmission control unit 10 includes, as a board temperature sensor for detecting a temperature of a unit board, a main board temperature sensor 31 and a sub board temperature sensor 32 that are used for performing a control to acquire temperature information as a redundant system. The main board temperature sensor 31 and the sub board temperature sensor 32 are ensured to be independent from each other. The sub board temperature sensor 32 is configured by an Application Specific Integrated Circuit (abbreviated as ASIC). That is, the main board temperature sensor 31 and the sub board temperature sensor 32 transmit a main temperature sensor value and a sub temperature sensor value to the transmission control unit 10, but unlike well-known automatic transmission units, temperature information that is obtained not in direct contact with a transmission fluid (ATF) in an oil pan is transmitted.

Signals from a turbine rotation sensor 13, an output shaft rotation sensor 14, an ignition switch 15, an inhibitor switch 18, an intermediate shaft rotation sensor 19, and the like are input to the transmission control unit 10, which is a control device for the automatic transmission 3.

The turbine rotation sensor 13 detects a turbine rotation speed (=transmission input shaft rotation speed) of the torque converter 2 and transmits a signal of a turbine rotation speed Nt to the transmission control unit 10. The output shaft rotation sensor 14 detects an output shaft rotation speed of the automatic transmission 3 and transmits a signal of an output shaft rotation speed No (=vehicle speed VSP) to the transmission control unit 10. The ignition switch 15 transmits an ignition switch signal (on/off) to the transmission control unit 10. The inhibitor switch 18 detects a range position selected by a select operation of a driver on a select lever, a select button, and the like, and transmits a range position signal to the transmission control unit 10. The intermediate shaft rotation sensor 19 detects a rotation speed of an intermediate shaft (an intermediate shaft=a rotation member connected to a first carrier C1), and transmits a signal of an intermediate shaft rotation speed Nint to the transmission control unit 10.

The transmission control unit 10 monitors changes in an operating point (VSP, APO), that is related to a vehicle speed VSP and an accelerator pedal opening APO, on a shift map (see FIG. 4), so as to perform shift control according to the following basic shift patterns:

1. Auto upshift (implemented by a vehicle speed increase in a state where an accelerator pedal opening is maintained)
2. Foot release upshift (implemented by an operation in which a foot leaves the accelerator pedal)
3. Foot ease upshift (implemented by an operation in which the accelerator pedal is eased up)
4. Power-on downshift (implemented by a vehicle speed decrease while the accelerator pedal opening is maintained)
5. Small opening sudden press downshift (implemented by pressing an accelerator pedal by a small operation amount)
6. Large opening sudden press downshift (implemented by pressing an accelerator pedal by a large operation amount: "kickdown")
7. Slow press downshift (implemented by pressing an accelerator pedal slowly and a vehicle speed increase)
8. Coast downshift (implemented by a vehicle speed decrease in an accelerator pedal release operation).

Signals from an accelerator pedal opening sensor 16, an engine rotation sensor 17, and the like are input to the engine control unit 11.

The accelerator pedal opening sensor 16 detects an accelerator pedal opening that is based on an accelerator operation of the driver, and transmits a signal of the accelerator pedal opening APO to the engine control unit 11. The engine rotation sensor 17 detects a rotation speed of the engine 1 and transmits a signal of an engine rotation speed Ne to the engine control unit 11.

In addition to various controls on the engine itself, the engine control unit 11 performs an engine torque limit control and the like by a cooperative control with a control of the transmission control unit 10. The transmission control unit 10 and the engine control unit 11 are connected via the CAN communication line 12 capable of bidirectionally exchanging information. Therefore, when an information request from the transmission control unit 10 is received, the engine control unit 11 outputs, in response to the request, information on the accelerator pedal opening APO, the engine rotation speed Ne, an engine torque Te, and a turbine torque Tt to the transmission control unit 10. In addition, when an upper limit torque-based engine torque limit request from the transmission control unit 10 is received, an engine torque limit control, in which the engine torque is limited by a predetermined upper limit torque, is executed.

[Detailed Configuration of Automatic Transmission]

Figure 2:
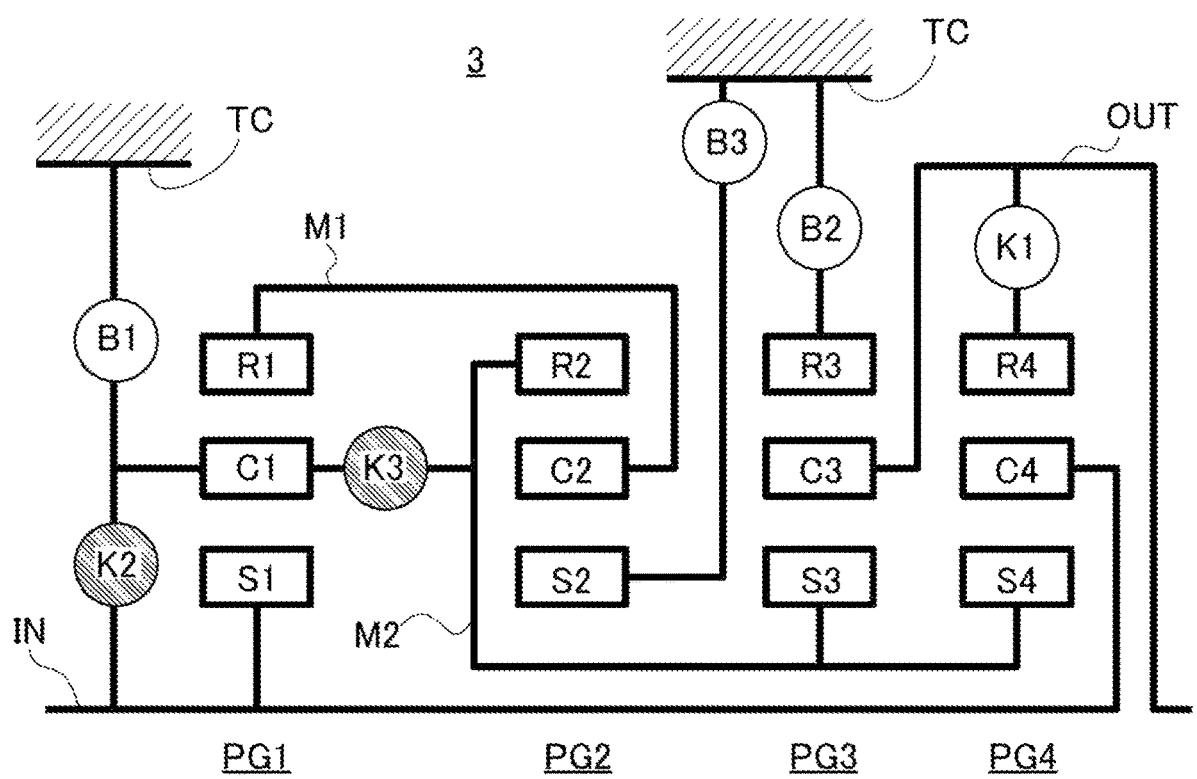
FIG. 2 is a skeleton diagram showing an example of the automatic transmission.
Figure 4:
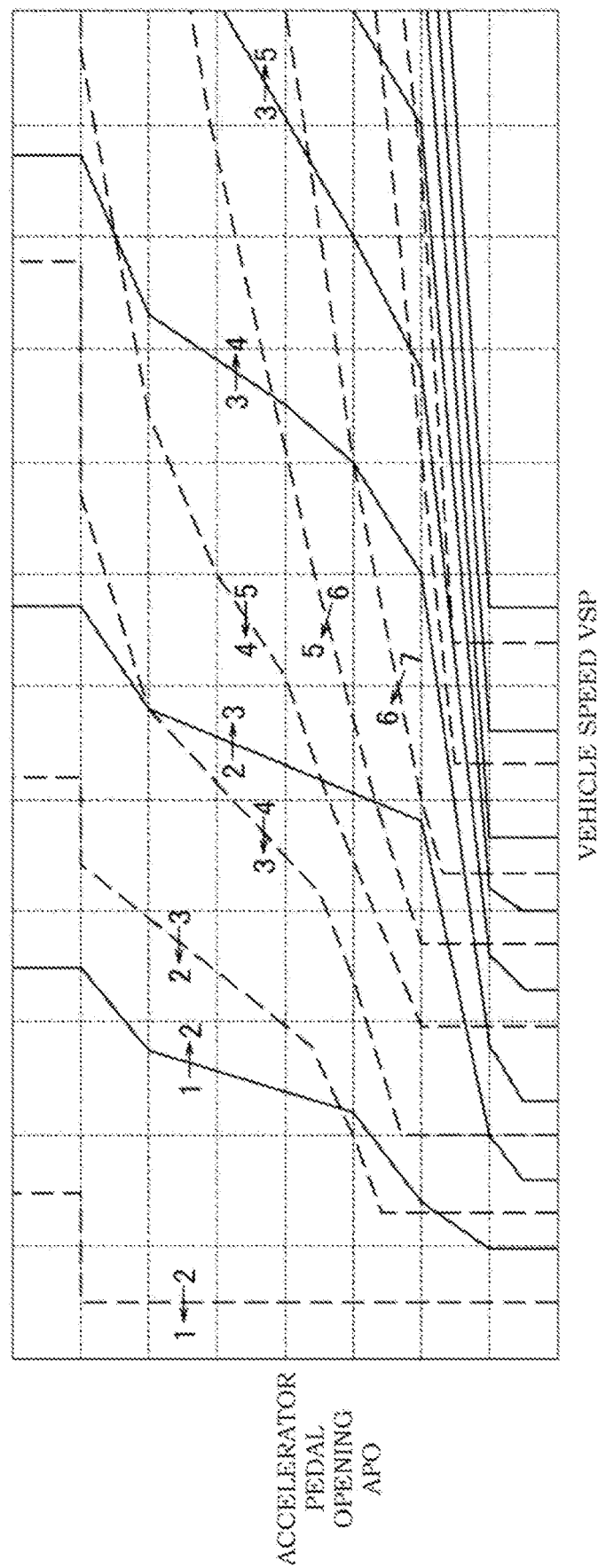
FIG. 4 is a shift map showing an example of a shift map in the automatic transmission.

FIG. 2 is a skeleton diagram showing an example of the automatic transmission 3, FIG. 3 is an engagement table for the automatic transmission 3, and FIG. 4 shows an example of a shift map for the automatic transmission 3. Hereinafter, the detailed configuration of the automatic transmission 3 will be described with reference to FIGS. 2 to 4.

The automatic transmission 3 is characterized by the following points.

(a) A one-way clutch that mechanically engages/idles is not used as a shift element.

(b) Engagement/disengagement states of a first brake B1, a second brake B2, a third brake B3, a first clutch K1, a second clutch K2, and a third clutch K3, which are friction engaging elements, are independently controlled by the clutch solenoid 20 at the time of a shift operation.

(c) The second clutch K2 and the third clutch K3 include centrifugal cancel chambers that offset a centrifugal pressure caused by a centrifugal force acting on a clutch piston oil chamber.

As shown in FIG. 2, the automatic transmission 3 includes, as planetary gears constituting a gear train, a first planetary gear PG1, a second planetary gear PG2, a third planetary gear PG3, and a fourth planetary gear PG4 in this order from the input shaft IN to an output shaft OUT.

The first planetary gear PG1 is a single pinion planetary gear, and includes a first sun gear S1, the first carrier C1 that supports pinions which mesh with the first sun gear S1, and a first ring gear R1 that mesh with the pinions.

The second planetary gear PG2 is a single pinion planetary gear, and includes a second sun gear S2, a second carrier C2 that supports pinions which mesh with the second sun gear S2, and a second ring gear R2 that mesh with the pinions.

The third planetary gear PG3 is a single pinion planetary gear, and includes a third sun gear S3, a third carrier C3 that supports pinions which mesh with the third sun gear S3, and a third ring gear R3 that mesh with the pinions.

The fourth planetary gear PG4 is a single pinion planetary gear, and includes a fourth sun gear S4, a fourth carrier C4 that supports pinions which mesh with the fourth sun gear S4, and a fourth ring gear R4 that mesh with the pinion.

As shown in FIG. 2, the automatic transmission 3 includes the input shaft IN, the output shaft OUT, a first connecting member M1, a second connecting member M2, and a transmission case TC. As the friction engaging elements that are engaged or disengaged by shifting, the first brake B1, the second brake B2, the third brake B3, the first clutch K1, the second clutch K2, and the third clutch K3 are provided.

The input shaft IN is a shaft to which a driving force from the engine 1 is input via the torque converter 2, and is connected to the first sun gear S1 and the fourth carrier C4 all the time. Further, the input shaft IN is detachably connected to the first carrier C1 via the second clutch K2.

The output shaft OUT is a shaft that outputs a shifted drive torque to the driving wheel 5 via the propeller shaft 4, a final gear (not shown), and the like, and is connected to the third carrier C3 all the time. Further, the output shaft OUT is detachably connected to the fourth ring gear R4 via the first clutch K1.

The first connecting member M1 is a member that connects the first ring gear R1 of the first planetary gear PG1 and the second carrier C2 of the second planetary gear PG2 all the time with no friction engaging element interposed therebetween. The second connecting member M2 is a member that connects the second ring gear R2 of the second planetary gear PG2, the third sun gear S3 of the third planetary gear PG3, and the fourth sun gear S4 of the fourth planetary gear PG4 all the time with no friction engaging element interposed therebetween.

The first brake B1 is a friction engaging element capable of locking rotation of the first carrier C1 with respect to the transmission case TC. The second brake B2 is a friction engaging element capable of locking rotation of the third ring gear R3 with respect to the transmission case TC. The third brake B3 is a friction engaging element capable of locking rotation of the second sun gear S2 with respect to the transmission case TC.

The first clutch K1 is a friction engaging element that selectively connects the fourth ring gear R4 and the output shaft OUT. The second clutch K2 is a friction engaging element that selectively connects the input shaft IN and the first carrier C1. The third clutch K3 is a friction engaging element that selectively connects the first carrier C1 and the second connecting member M2.

FIG. 3 shows an engagement table for achieving each of nine forward speeds and one reverse speed in a D range by a combination of simultaneously engaging three friction engaging elements among the six friction engaging elements in the automatic transmission 3. A shift configuration in which each gear position is achieved will be described with reference to FIG. 3.

A first speed position (1st) is achieved by simultaneously engaging the second brake B2, the third brake B3, and the third clutch K3. A second speed position (2nd) is achieved by simultaneously engaging the second brake B2, the second clutch K2, and the third clutch K3. A third speed position (3rd) is achieved by simultaneously engaging the second brake B2, the third brake B3, and the second clutch K2. A fourth speed position (4th) is achieved by simultaneously engaging the second brake B2, the third brake B3, and the first clutch K1. A fifth speed position (5th) is achieved by simultaneously engaging the third brake B3, the first clutch K1, and the second clutch K2. The above-mentioned first to fifth speed positions are underdrive gear positions with a reduction gear ratio exceeding 1.

A sixth speed position (6th) is achieved by simultaneously engaging the first clutch K1, the second clutch K2, and the third clutch K3. This sixth speed position is a direct connection gear position with a gear ratio of 1.

A seventh speed position (7th) is achieved by simultaneously engaging the third brake B3, the first clutch K1, and the third clutch K3. An eighth speed position (8th) is achieved by simultaneously engaging the first brake B1, the first clutch K1, and the third clutch K3. A ninth speed position (9th) is achieved by simultaneously engaging the first brake B1, the third brake B3, and the first clutch K1. The above-mentioned seventh to ninth speed positions are overdrive gear positions with on a speed increasing gear ratio of less than 1.

Further, when the gear position is upshifted or downshifted to an adjacent gear position among the gear positions of the first gear position to the ninth gear position, as shown in FIG. 3, an interchange shift is performed. That is, shifting to the adjacent gear position is achieved by maintaining an engagement of two friction engaging elements among three friction engaging elements, disengaging one friction engaging element, and engaging another friction engaging element.

A reverse speed position (Rev) based on a selection of an R range position is achieved by simultaneously engaging the first brake B1, the second brake B2, and the third brake B3. When an N range position and a P range position are selected, all of the six friction engaging elements B1, B2, B3, K1, K2, and K3 are disengaged.

Further, a shift map as shown in FIG. 4 is stored and set in the transmission control unit 10, and a shift by switching a gear position from the first speed position to the ninth speed position on a forward side by a selection of the D range is performed according to this shift map. That is, when the operating point (VSP, APO) at that time crosses an upshift line shown by a solid line in FIG. 4, an upshifting request is issued. In addition, when the operating point (VSP, APO) cross a downshift line shown by a broken line in FIG. 4, a downshifting request is issued.

[Detailed Configuration of Hydraulic Control System]

Figure 5:
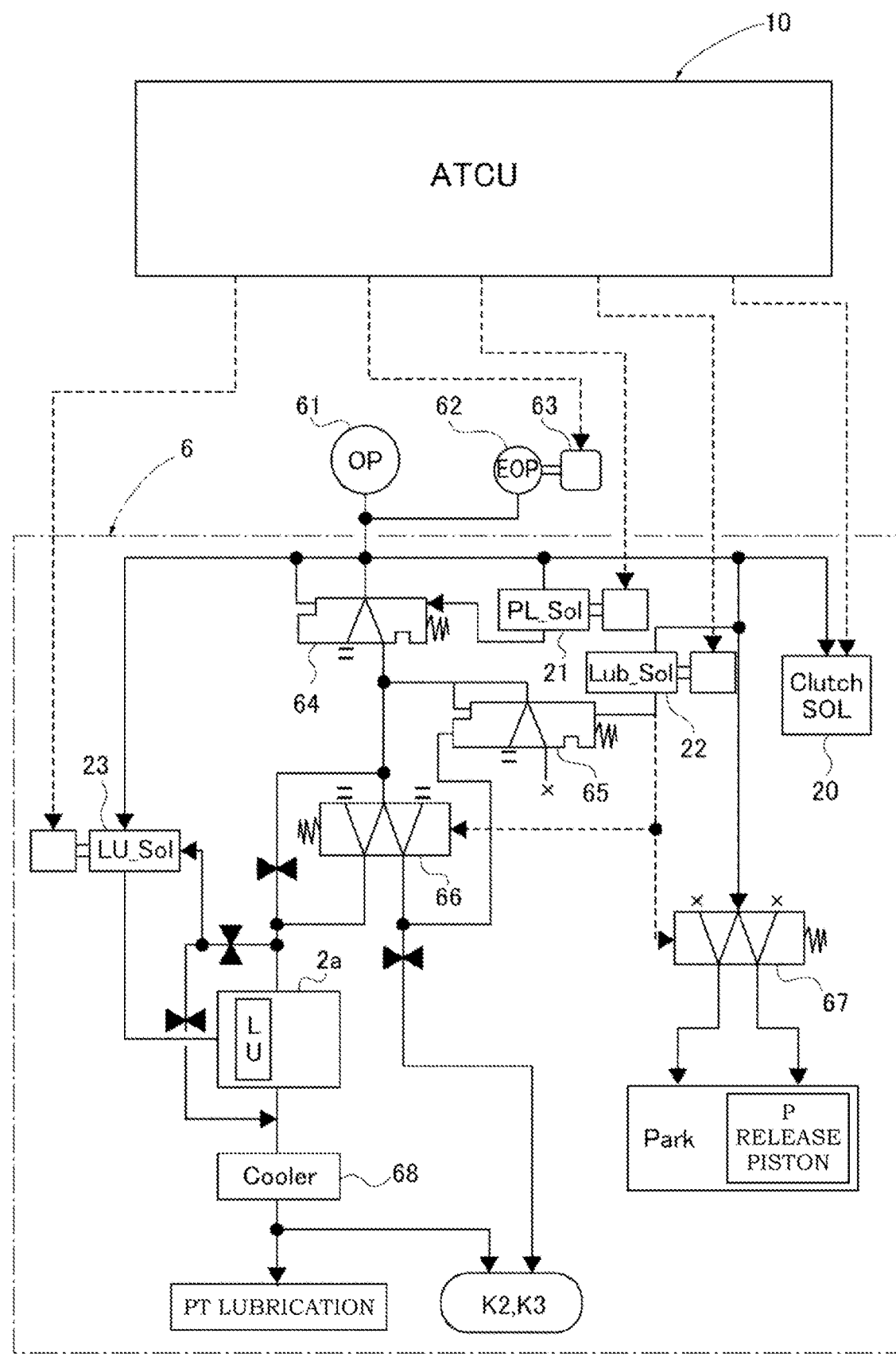
FIG. 5 is a diagram showing a detailed configuration of a control valve unit of the automatic transmission.

FIG. 5 shows a detailed configuration of the control valve unit 6. Hereinafter, the detailed configuration of the hydraulic control system will be described with reference to FIG. 5.

The control valve unit 6 includes, as hydraulic sources, a mechanical oil pump 61 and an electric oil pump 62. The mechanical oil pump 61 is pump-driven by the engine 1, and the electric oil pump 62 is pump-driven by an electric motor 63.

The control valve unit 6 includes, as valves provided in the hydraulic control circuit, the line pressure solenoid 21, a line pressure regulating valve 64, the clutch solenoid 20, and the lock-up solenoid 23. The control valve unit 6 further includes the lubrication solenoid 22, a lubrication pressure regulating valve 65, a boost switching valve 66, a P-nP switching valve 67, and a cooler 68.

The line pressure regulating valve 64 regulates, based on a valve operation signal pressure from the line pressure solenoid 21, a pressure of oil, that is discharged from at least one of the mechanical oil pump 61 and the electric oil pump 62, to a line pressure PL.

The clutch solenoid 20 is a shift solenoid that uses the line pressure PL as an initial pressure and controls an engagement pressure and a disengagement pressure for each of the friction engaging elements (B1, B2, B3, K1, K2, K3). Although only one clutch solenoid 20 is illustrated in FIG. 5, six solenoids are provided for the friction engaging elements (B1, B2, B3, K1, K2, K3). The six clutch solenoids 20 are a first brake solenoid, a second brake solenoid, a third brake solenoid, a first clutch solenoid, a second clutch solenoid, and a third clutch solenoid.

The lock-up solenoid 23 controls a differential pressure of the lock-up clutch 2a by using excess oil at the time of regulating the line pressure PL by the line pressure regulating valve 64.

The lubrication solenoid 22 has a function of generating a valve operation signal pressure to the lubrication pressure regulating valve 65, a switching pressure to the boost switching valve 66, and a switching pressure to the P-nP switching valve 67, and adjusting a lubrication flow rate to be supplied to the friction engaging elements to an appropriate flow rate for reducing heat generation. The lubrication solenoid 22 is also a solenoid that mechanically guarantees a minimum lubrication flow rate for reducing heat generation of the friction engaging elements in a case other than a continuous shift protection, and adjusts a lubrication flow rate added to a minimum lubrication flow rate.

The lubrication pressure regulating valve 65 can control a lubrication flow rate, that is to be supplied to a power train (PT) including the friction engaging elements and the gear train via a cooler 68, according to the valve operation signal pressure from the lubrication solenoid 22. Further, the lubrication pressure regulating valve 65 reduces frictions by optimizing the lubrication flow rate supplied to the PT.

The boost switching valve 66 increases an amount of oil supplied to the centrifugal cancel chambers of the second clutch K2 and the third clutch K3 according to the switching pressure from the lubrication solenoid 22. This boost switching valve 66 is used to temporarily increase the amount of oil supplied in a scene where the amount of oil in the centrifugal cancel chambers is insufficient.

The P-nP switching valve 67 switches an oil path of a line pressure to be supplied to a parking module according to the switching pressure from the lubrication solenoid 22, and performs a parking lock operation.

In this way, the control valve unit 6 is characterized in including the lubrication solenoid 22, the lubrication pressure regulating valve 65, the boost switching valve 66, and the P-nP switching valve 67, and eliminating a manual valve that switches between a D-range pressure oil path and an R-range pressure oil path.

[Detailed Configuration of Electronic Control System]

Figure 6:
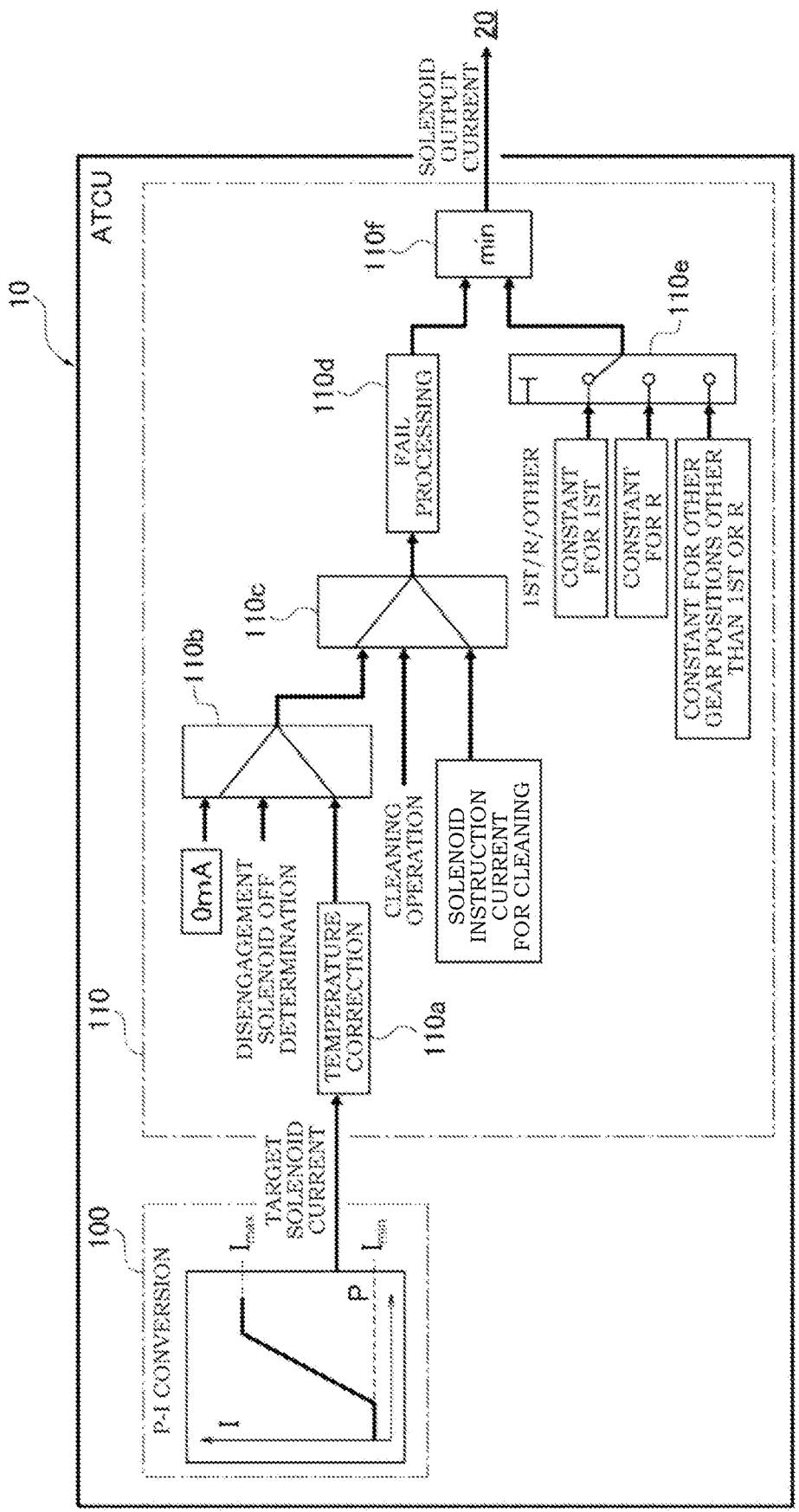
FIG. 6 is a control block diagram showing a shift controller and a solenoid management controller of a transmission control unit.

FIG. 6 shows a shift controller 100 and a solenoid management controller 110 of the transmission control unit 10. Hereinafter, the detailed configuration of the electronic control system will be described with reference to FIG. 6.

As shown in FIG. 6, the transmission control unit 10 includes the shift controller 100 that shares a shifting function of the automatic transmission 3, and the solenoid management controller 110 that shares a solenoid disconnection diagnosis function, a solenoid current limiting function, and a cleaning function. The "cleaning function" refers to a function of supplying a dither current to the hydraulic solenoid when the vehicle is stopped in the P range to cause a piston movement in a valve spool to remove foreign matters called contamination.

The shift controller 100 calculates a target oil pressure for each friction engaging element in a shift transition period during which the gear position is changed or when the gear position is fixed to a predetermined gear position. Further, a P-I conversion unit 100a that receives the target oil pressure of a calculation result and converts the target oil pressure into a target solenoid current to be supplied to the six clutch solenoids 20 is provided.

The P-I conversion unit 100a outputs an offset current value Imin (corresponding to the Imin in FIG. 6) as the target solenoid current when the target oil pressure applied to the friction engaging element is zero. Further, a current value proportional to an increase in oil pressure when the target oil pressure applied to the friction engaging element is increased from zero to a maximum pressure is output, and a maximum instruction current value Imax (the Imax in FIG. 6) is output, as the target solenoid current, in an in-gear state in which the target oil pressure applied to the friction engaging element is set to the maximum pressure.

Here, the "offset current value Imin" is defined as a current value in an upper limit range for maintaining a disengagement of the disengagement-side friction engaging elements, that is, a current value that does not reach an engagement oil pressure of the friction engaging elements but keeps a hydraulic fluid filled in a hydraulic circuit communicating with the friction engaging elements. Reasons for supplying the offset current value Imin to disengagement solenoids include a "solenoid OFF sticking determination (a solenoid disconnection diagnosis)" and a "countermeasure against delay in a rise of the oil pressure". The "maximum instruction current value Imax" is a fixed current value uniformly determined based on the maximum pressure of friction engaging elements among the engagement-side friction engaging elements. A reason for supplying the maximum instruction current value Imax to an engagement solenoid during the in-gear state is to prevent a clutch slippage or a brake slippage even when a transmission torque is high due to a high load, and to ensure a desired allowable torque capacity.

As a basic control, the solenoid management controller 110 supplies the offset current value Imin to disengagement solenoid of the disengagement-side friction engaging elements among a plurality of shift solenoids that control shift oil pressures applied to a plurality of friction engaging elements. Further, a temperature correction unit 110a, a first solenoid current selection unit 110b, a second solenoid current selection unit 110c, a fail processing unit 110d, a constant selection unit 110e, and a minimum value selection unit 110f are provided.

The temperature correction unit 110a corrects the target solenoid current output from the P-I conversion unit 100a according to a temperature, and generates a temperature corrected solenoid current.

The first solenoid current selection unit 110b receives the temperature corrected solenoid current from the temperature correction unit 110a, and selects the temperature corrected solenoid current based on a determination that the disengagement solenoid is prohibited to be turned off. Meanwhile, 0 mA (zero) is selected, based on a determination that the disengagement solenoid is allowed to be turned off, as an output current supplied to two disengagement solenoids among three disengagement solenoids.

The second solenoid current selection unit 110c receives the temperature corrected solenoid current from the first solenoid current selection unit 110b, and selects the temperature corrected solenoid current based on a determination that a cleaning operation condition is not satisfied. Meanwhile, a cleaning solenoid instruction current (the dither current) is selected based on a determination that the cleaning operation condition is satisfied.

The fail processing unit 110d performs the solenoid disconnection diagnosis when the temperature corrected solenoid current is selected by the second solenoid current selection unit 110c and the output currents to the engagement solenoid and the disengagement solenoids are other than 0 mA (zero). In the solenoid disconnection diagnosis, when a state of 0 mA (zero) continues for a predetermined time even though the power is on, the solenoid is diagnosed as disconnected. In addition, when a diagnosis result is that the solenoid is not disconnected, the temperature corrected solenoid current from the second solenoid current selection unit 110c is output. Meanwhile, when the diagnosis result is that the solenoid is disconnected, the process shifts to a predetermined fail-safe process.

Based on the determination of the gear position of the automatic transmission 3, the constant selection unit 110e selects at least one of a constant for the first speed position (constant for 1st), a constant for the reverse position (constant for R), or a constant for another gear position other than the first speed position or the reverse position (constant for another gear position other than 1st or R). Here, each "constant" is a constant for limiting the maximum instruction current value Imax of the temperature corrected solenoid current supplied to the engagement solenoid at each gear position to an upper limit value Ilmt that is based on a required engaging element pressure determined for each of the engagement-side friction engaging elements at each gear position.

The minimum value selection unit 110f selects a minimum value between the temperature corrected solenoid current from the fail processing unit 110d and the upper limit value Ilmt from the constant selection unit 110e, and sets the minimum value as a final solenoid output current.

The solenoid management controller 110 executes the following solenoid current limit control based on the basic control of supplying the offset current value Imin to the disengagement solenoid with the shift solenoids (the clutch solenoids 20) as control targets. Solenoids (the line pressure solenoid 21, the lubrication solenoid 22, and the lock-up solenoid 23) other than the shift solenoids (the clutch solenoids 20) are used within a respective guaranteed upper limit current value thereof.

(a) When a sum of current values to be supplied to the engagement solenoids of the engagement-side friction engaging elements among the plurality of friction engaging elements exceeds a predetermined value, the offset current value Imin supplied to at least one of the disengagement solenoids is set to zero.

(b) The predetermined value is set to a value obtained by subtracting, from the guaranteed upper limit current value IMAX that guarantees suppression of a temperature rise of a solenoid drive circuit including a solenoid drive IC which is a heat generation source, a total offset current ΣImin when the offset current value Imin is supplied to all of the disengagement solenoids.

(c) The maximum instruction current value Imax to be supplied to the engagement solenoid during the in-gear state is limited, from a fixed current value Ifix that is based on the maximum engaging element pressure at all of gear positions, to the upper limit value Ilmt that is based on the required engaging element pressure determined for each of the engagement-side friction engaging elements at each gear position.

(d) When a current gear position is a gear position in which a sum ΣIlmt of the upper limit value Ilmt to be supplied to the engagement solenoids exceeds a predetermined value, a current value is set to zero which is supplied to, among the disengagement solenoids, disengagement solenoids that are not engaged in a next gear position to which the gear position is shifted from the current gear position. When the current gear position is a gear position in which the sum ΣIlmt of the upper limit value Ilmt to be supplied to the engagement solenoids does not exceed the predetermined value, the offset current value Imin is supplied to all of the disengagement solenoids.

[Configuration of Solenoid Current Limit Control Process]

Figure 7:
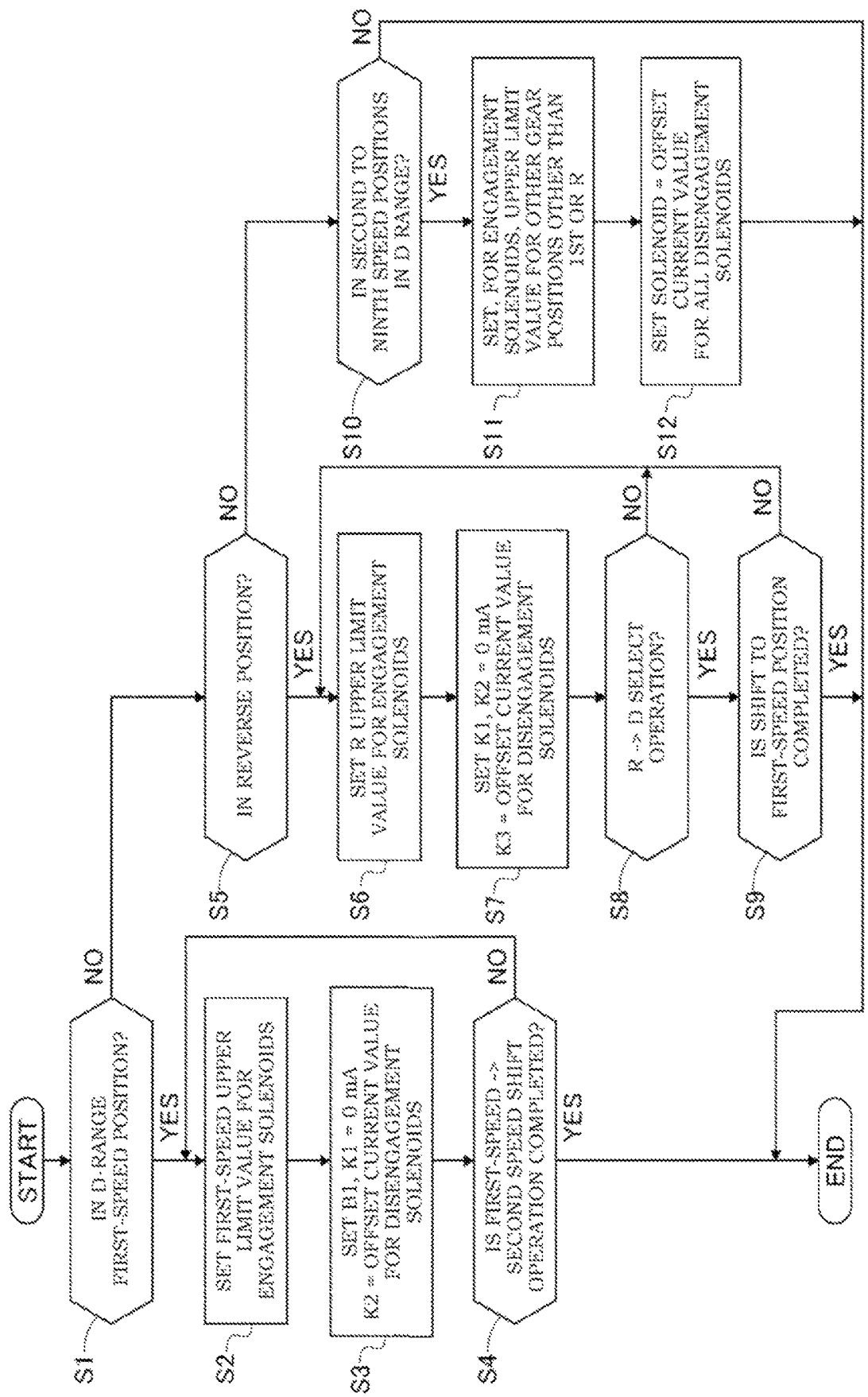
FIG. 7 is a flowchart showing a flow of a solenoid current limit control process which is executed by the solenoid management controller of the transmission control unit.

In the solenoid current limit control of (d), the gear position, in which the sum ΣIlmt of the upper limit value Ilmt to be supplied to the engagement solenoids exceeds the predetermined value, is defined as the "first speed position" and the "reverse position". The gear position, in which the sum ΣIlmt of the upper limit value Ilmt to be supplied to the engagement solenoids does not exceed the predetermined value, is defined as a gear position "other than the first speed position or the reverse position (the second to ninth speed positions)". Hereinafter, the flow of the solenoid current limit control process executed by the solenoid management controller 110 of the transmission control unit 10 will be described with reference to the above. The process according to the flowchart of FIG. 7 is repeatedly executed according to a predetermined control cycle.

In step S1, after the process starts, it is determined whether the gear position of the automatic transmission 3 is a D-range first speed position. In a case of YES (the gear position is the D-range first speed position), the process proceeds to step S2, and in a case of NO (the gear position is a gear position other than the D-range first speed position), the process proceeds to step S5. The gear position is detected based on detection of the range position performed by a switch signal from the inhibitor switch 18, a shift command signal output from the shift controller 100, and the like.

In step S2, following the determination in S1 that the gear position is the D-range first speed position, or a determination in S4 that a first speed→second speed shift operation is not completed, a maximum instruction current value Imax in the in-gear state is set, for the engagement solenoids in the first speed position, to a first speed upper limit value Ilmt (1st), and the process proceeds to step S3.

Here, the "engagement solenoids in the first speed position" refers to the second brake solenoid that engages the second brake B2, the third brake solenoid that engages the third brake B3, and the third clutch solenoid that engages the third clutch K3. The "first speed upper limit value Ilmt (1st)" refers to a current value obtained by distributing a value, which is obtained by subtracting the offset current value Imin to be supplied to one of the disengagement solenoids from the guaranteed upper limit current value IMAX, to the three solenoids in the first speed position according to a magnitude of the allowable torque capacity. For example, when the guaranteed upper limit current value IMAX is set to 3.60 A and the offset current value Imin is sets to 0.05 A, a current value difference of 3.55 A is distributed as 1.20 A for the second brake solenoid, 1.15 A for the third brake solenoid, and 1.20 A for the third clutch solenoid.

In step S3, following the setting of the first speed upper limit value Ilmt (1st) for the engagement solenoids in the first speed position in S2, a current value is set to zero which is supplied to, among three disengagement solenoids in the first speed position, two disengagement solenoids that are not engaged in the second speed position to which the gear position is shifted from the first speed position.

Here, the "disengagement solenoids in the first speed position" refers to the first brake solenoid that disengages the first brake B1, the first clutch solenoid that disengages the first clutch K1, and the second clutch solenoid that disengages the second clutch K2. As shown in FIG. 8, the "two disengagement solenoids that are not engaged in the second speed position" refer to the first brake solenoid that disengages the first brake B1 and the first clutch solenoid that disengages the first clutch K1. For example, when the offset current value Imin is set to 0.05 A (=50 mA), a total current value of 0.1 A (=100 mA) is reduced by setting the current value supplied to the first brake solenoid 20a and the first clutch solenoid 20d to 0 mA.

In step S4, following the setting of the current value supplied to the disengagement solenoids in the first speed position in S3, it is determined whether the first speed→second speed shift operation is completed. In a case of YES (the first speed→second speed shift operation is completed), the process proceeds to the end, and in a case of NO (the first speed→second speed shift operation is not completed), the process returns to step S2.

In step S5, following the determination in S1 that the gear position is a gear position other than the D-range first speed position, it is determined whether the gear position is the reverse position based on the selection of the R range. In a case of YES (the gear position is the reverse position), the process proceeds to step S6, and in a case of NO (the gear position is a gear position other than the reverse position), the process proceeds to step S10.

In step S6, following the determination in S5 that the gear position is the reverse position, a determination in S8 that the select operation is not an R→D select operation, or a determination in S9 that the shift to the first speed is not completed, the maximum instruction current value Imax in the in-gear state is set, for engagement solenoids in the reverse position, to an R upper limit value Ilmt (R), and the process proceeds to step S7.

Here, the "engagement solenoids in the reverse position" refers to the first brake solenoid that engages the first brake B1, the second brake solenoid that engages the second brake B2, and the third brake solenoid that engages the third brake B3. The "R upper limit value Ilmt (R)" is a current value obtained by distributing a value, which is obtained by subtracting the offset current value Imin to be supplied to one disengagement solenoid from the guaranteed upper limit current value IMAX, to three solenoids in the reverse position according to the magnitude of the allowable torque capacity. For example, when the guaranteed upper limit current value IMAX is set to 3.60 A and the offset current value Imin is set to 0.05 A, the current value difference of 3.55 A is distributed as 1.20 A for the first brake solenoid, 1.20 A for the second brake solenoid, and 1.15 A for the third brake solenoid.

In step S7, following the setting of the R upper limit value Ilmt (R) for the engagement solenoids in the reverse position in S6, a current value is set to zero which is supplied to, among three disengagement solenoids in the reverse position, two disengagement solenoids that are not engaged in the first speed position to which the gear position is shifted from the reverse position.

Here, the "disengagement solenoids in the reverse position" refers to the first clutch solenoid that disengages the first clutch K1, the second clutch solenoid that disengages the second clutch K2, and the third clutch solenoid that disengages the third clutch K3. As shown in FIG. 9, the "two disengagement solenoids that are not engaged in the first speed position" refer to the first clutch solenoid that disengages the first clutch K1 and the second clutch solenoid that disengages the second clutch K2. For example, when the offset current value Imin is set to 0.05 A (=50 mA), a total current value of 0.1 A (=100 mA) is reduced by setting the current value supplied to the first clutch solenoid and the second clutch solenoid to 0 mA.

In step S8, following the setting of the current value for the disengagement solenoids in the reverse position in S7, it is determined whether the select operation is the R→D select operation. In a case of YES (R→D select operation), the process proceeds to step S9, and in a case of NO (not the R→D select operation), the process returns to step S6.

In step S9, following the determination in S8 that the select operation is the R→D select operation, the D range is selected, and then it is determined whether a shift to the first speed position is completed. In a case of YES (the shift to the first speed position is completed), the process proceeds to the end, and in a case of NO (the shift to the first speed position is not completed), the process returns to step S6.

In step S10, following the determination in S5 that the gear position is a gear position other than the reverse position, it is determined whether the gear position is any of the second to ninth speed positions in the D range. In a case of YES (the gear position is one of the second to ninth speed positions in the D range), the process proceeds to the end, and in a case of NO (the gear position is not in one of the second to ninth speed positions in the D range), the process proceeds to the end.

In step S11, following the determination in S10 that the gear position is one of the second to ninth speed positions in the D range, for the engagement solenoids in one of the second to ninth speed positions in the D range, the maximum instruction current value Imax in the in-gear state is set to an upper limit value Ilmt (2 to 9) for other gear positions other than 1st or R, and the process proceeds to step S12.

Here, as shown in FIG. 3, the "engagement solenoids in one of the second to ninth speed positions in the D range" refer to engagement solenoids that are engaged in one of gear positions of the second to ninth speed positions. The "upper limit value Ilmt (2 to 9) for other gear positions other than 1st or R" refers to a current value obtained by evenly distributing a value, which is obtained by subtracting the offset current value Imin to be supplied to three disengagement solenoids from the guaranteed upper limit current value IMAX, to three engagement solenoids that are engaged in one of the gear positions of the second to ninth speed positions. For example, when the guaranteed upper limit current value IMAX is set to 3.60 A and the offset current value Imin is set to 0.05 A (a total 0.15 A for the three engagement solenoids), a current value difference of 3.45 A is evenly distributed as 1.15 A for each of the three engagement solenoids that are engaged in one of the gear positions of the second to ninth speed positions.

In step S12, following the setting of the upper limit value Ilmt (2 to 9) for other gear positions other than 1st or R, for the engagement solenoids in one of the second to ninth speed positions in S11, the offset current value Imin is supplied to three disengagement solenoids that are disengaged in one of the gear positions of the second to ninth speed positions in the D range. Here, as shown in FIG. 3, the "disengagement solenoids in one of the second to ninth speed positions in the D range" refer to three disengagement solenoids that are disengaged in one of the gear positions of the second to ninth speed positions.

Next, "Problems to be Solved and Solution to Problems" will be described. Further, an effect of the first embodiment will be described separately as "Operation of Solenoid Current Limit Control Process" and "Operation of Electrical Diagnosis of Board Temperature Sensors".

Problems to be Solved and Solution to Problems

In the background art, the maximum instruction current in the in-gear state supplied to the engagement solenoids among the shift solenoids is a fixed current value that is uniformly determined based on the friction engaging element that has a maximum allowable torque capacity in all of the gear positions. Further, an offset current value is supplied to all of the disengagement solenoids of the shift solenoids in order to allow solenoid disconnection diagnosis.

Therefore, as the number of friction engaging elements increases when the number of gear positions of automatic transmissions increases, an amount of current to be supplied to the shift solenoids increases accordingly. Therefore, there is a problem that as the number of gear positions increases, total current consumption which is a sum of currents supplied to all of the shift solenoids increases, which leads to an increase in a solenoid load on a transmission control unit.

In response to the above-mentioned problem of the increase in the solenoid load, a first solution is provided to maintain supply of the fixed current value for the engagement solenoids and set all of the current values supplied to the disengagement solenoids to zero. However, in a case of the first solution, as a side effect, a disconnection diagnosis of the disengagement solenoids cannot be performed, and a delay in a rise of the oil pressure and a deviation of the oil pressure occur when the gear position is shifted to the next gear position.

In response to the above-mentioned problem of the increase in the solenoid load, a second solution is provided to maintain supply of the offset current value for the disengagement solenoids and uniformly reduce the fixed current value supplied to the engagement solenoids. However, in a case of the second solution, as a side effect, the allowable torque capacity of the automatic transmission is reduced.

In response to the above-mentioned problem of the increase in the solenoid load, a third solution is provided to maintain the supply of the offset current value for the disengagement solenoids and set the fixed current value supplied to the engagement solenoid as a current value related to a required capacity. However, in a case of the third solution, as a side effect, there may be a scene where the guaranteed upper limit current value guaranteed by ATCU is exceeded depending on a vehicle type, and a service life of the solenoid may be shortened due to the temperature rise of the solenoid drive IC.

In response to the above-mentioned problem of the increase in the solenoid load, a fourth solution is provided to maintain the supply of the offset current value for the disengagement solenoids and switch the upper limit current value supplied to the engagement solenoids according to a scene (for example, a scene for each gear position). However, in a case of the fourth solution, as a side effect, there may be a scene where the guaranteed upper limit current value guaranteed by ATCU is exceeded depending on a vehicle type, and similar to the third solution, the service life of the solenoid may be shortened due to the temperature rise of the solenoid drive IC.

The present inventors have focused on a point that as a result of a current situation analysis and a problem examination, the solenoid load is effectively reduced by combining the fourth solution of separating a high load scene and a low load scene of the shift solenoids with the first solution of decreasing the current value supplied to the disengagement solenoids to be lower than the offset current value.

Based on the above-mentioned focused point, the following means to solve the problems will be described. The control device for an automatic transmission according to the embodiment of the invention includes the transmission control unit 10 configured to control an engagement/disengagement state of each of a plurality of friction engaging elements in the gear train of the automatic transmission 3, so as to set a plurality of gear positions. In the control device for the automatic transmission 3, the transmission control unit 10 includes the solenoid management controller 110 configured to supply the offset current value Imin to the disengagement solenoids of the disengagement-side friction engaging elements among a plurality of clutch solenoids 20 that control shift oil pressures applied to the respective plurality of friction engaging elements. The solenoid management controller 110 is configured to, when a sum of current values to be supplied to the clutch solenoids 20 exceeds a predetermined value, decrease a current value to be supplied to at least one of the disengagement solenoids that are supplied with the offset current value Imin to be lower than the offset current value Imin.

That is, when the sum of the current values to be supplied to the engagement solenoids of the engagement-side friction engaging elements among the plurality of friction engaging elements exceeds a predetermined value, a solenoid high load scene can be determined. Meanwhile, when the sum of the current values to be supplied to the engagement solenoids of the engagement-side friction engaging elements among the plurality of friction engaging elements is equal to or less than the predetermined value, a solenoid low load scene can be determined. In this way, the solenoid high load scene and the solenoid low load scene can be separated.

Further, when the solenoid high load scene is determined, the current value to be supplied to at least one of the disengagement solenoids is decreased to be lower than the offset current value Imin. Therefore, by decreasing the offset current value Imin supplied to the disengagement solenoids, the total current consumption which is the sum of the currents supplied to all of the shift solenoids is reduced. Meanwhile, when the solenoid low load scene is determined, the offset current value Imin is supplied to the disengagement solenoids based on the basic control. Therefore, the disconnection diagnosis of the disengagement solenoids can be ensured, and occurrence of the delay in the rise of the oil pressure and the deviation of the oil pressure when the gear position is shifted to the next gear position can be prevented.

As a result, the solenoid load of the transmission control unit 10 can be reduced while suppressing deterioration of the disconnection diagnosis function of the shift solenoids (the clutch solenoids 20) when the number of gear positions of the automatic transmission 3 is increased. That is, different from reducing the solenoid load of the transmission control unit 10 simply by reducing the offset current value Imin supplied to the disengagement solenoid, the scene of reducing the offset current value Imin is limited to the solenoid high load scene. Therefore, not only the disconnection diagnosis function of the shift solenoids (the clutch solenoids 20) is ensured but also the solenoid load of the transmission control unit 10 is reduced. For example, when the current value to be supplied to the disengagement solenoid is set to zero, the disconnection diagnosis function is temporarily lost only while the gear position is maintained, but the disconnection diagnosis function is restored as soon as the current value is supplied to the disengagement solenoid by shifting to another gear position, and therefore, the disconnection diagnosis function is not impaired.

[Operation of Solenoid Current Limit Control Process]

An operation of the solenoid current limit control process in the first embodiment will be described based on a flowchart shown in FIG. 7. First, when a current gear position of the automatic transmission 3 is the first speed position, the process proceeds in the order of S1→S2→S3→S4. While it is determined in S4 that the first speed→second speed shift operation is not completed, a flow of S2→S3→S4 is repeated.

In step S2, the maximum instruction current value Imax in the in-gear state is set, for the engagement solenoids in the first speed position, to the first speed upper limit value Ilmt (1st). In step S3, the current value is set to zero which is supplied to, among the three disengagement solenoids in the first speed position, two disengagement solenoids that are not engaged in the second speed position to which the gear position is shifted from the first speed position.

Figure 10:
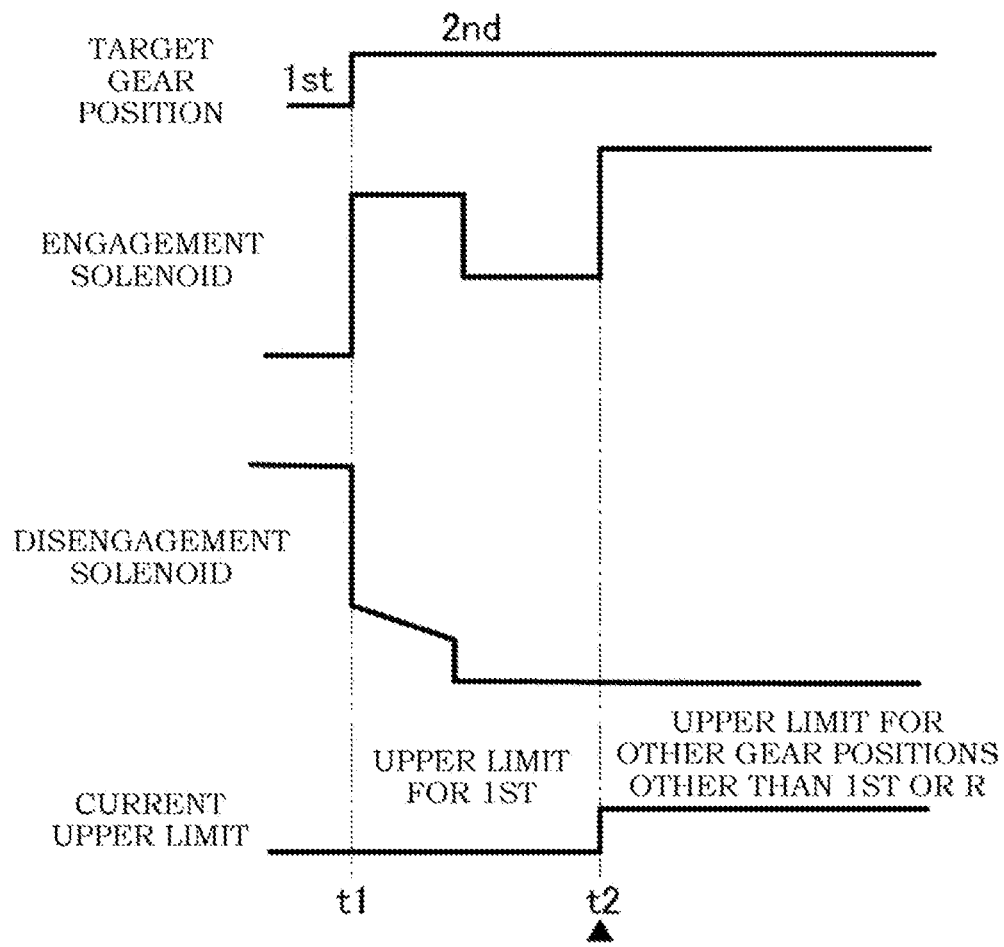
FIG. 10 is a time chart showing a switching timing of an upper limit value at the time of a 1st→2nd shift operation.

When it is determined in S4 that the first speed→second speed shift operation is completed, the process proceeds from S4 to the end. In this way, in a case where the current gear position of the automatic transmission 3 is the first speed position, as shown in FIG. 10, even when a target gear position is switched from the first speed position to the second speed position at a time t1, the setting of the first speed upper limit value Ilmt (1st) is maintained until a time t2 at which it is determined that the first speed→second speed shift operation is completed. When the time reaches the time t2 at which it is determined that the first speed-→second speed shift operation is completed, the first speed upper limit value Ilmt (1st) is switched to the upper limit value Ilmt (2 to 9) for other gear positions other than 1st or R.

Next, when the current gear position of the automatic transmission 3 is the reverse position, the process proceeds in the order of S1→S5→S6→S7→S8. While it is determined in S8 that the select operation is not the R→D select operation, a flow of S6→S7→S8 is repeated. Further, when it is determined in S8 that the select operation is the R→D select operation, the process proceeds from S8 to S9, and while it is determined in S9 that the shift to the first speed position is not completed, a flow of S6→S7→S8→S9 is repeated.

In step S6, the maximum instruction current value Imax in the in-gear state is set, for the engagement solenoids in the reverse position, to the R upper limit value Ilmt (R). In step S7, the current value is set to zero which is supplied to, among the three disengagement solenoids in the reverse position, two disengagement solenoids that are not engaged in the first speed position to which the gear position is shifted from the reverse position.

Figure 11:
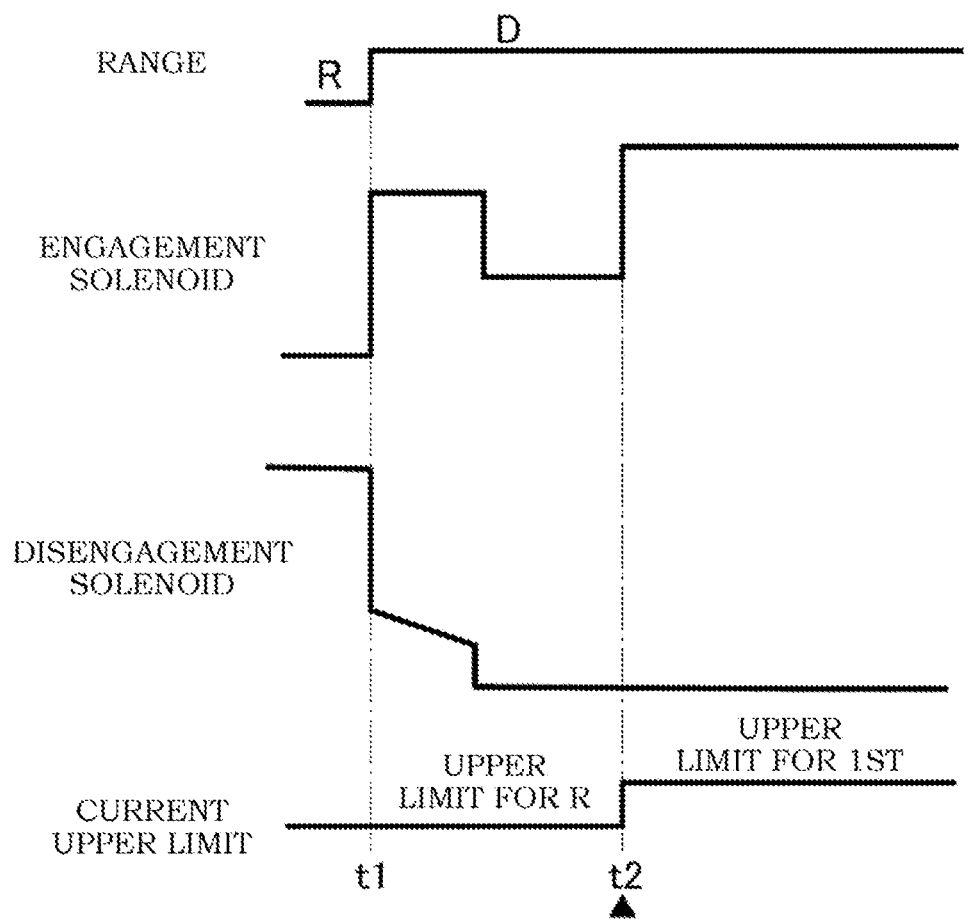
FIG. 11 is a time chart showing a switching timing of an upper limit value at the time of an R→D select operation.

When it is determined in S9 that the shift to the first speed position is completed, the process proceeds from S9 to the end. In this way, in a case where the current gear position of the automatic transmission 3 is the reverse position, as shown in FIG. 11, even when the range position is switched from the R range to the D range at a time t1, the setting of the R upper limit value Ilmt (R) is maintained until a time t2 at which it is determined that the shift to the first speed position in the D range is completed. When the time reaches the time t2 at which it is determined that the shift to the first speed position in the D range is completed, the R upper limit value Ilmt (R) is switched to the first speed upper limit value Ilmt (1st).

Next, when the current gear position of the automatic transmission 3 is any of the second to ninth speed positions in the D range, the process proceeds in the order of S1→S5→S10→S11→S12→the end. When it is determined in S10 that the gear position is not in one of the second to ninth speed positions in the D range, a flow of S1→S5→S10→S11→S12→the end is repeated.

In step S11, the maximum instruction current value Imax in the in-gear state is set, for the engagement solenoids in one of the second to ninth speed positions in the D range, to the upper limit value Ilmt (2 to 9) for other gear positions other than 1st or R. In step S12, the offset current value Imin is supplied to the three disengagement solenoids that are disengaged in one of the gear positions of the second to ninth speed positions in the D range.

As described above, when the current gear position of the automatic transmission 3 is the first speed position, the current value is set to zero which is supplied to the disengagement solenoids of the disengagement-side friction engaging elements that are not engaged in the second speed position which is the next gear position.

That is, in the first speed position where the allowable torque capacity is high, if the offset current value Imin is supplied to all of the disengagement solenoids, the sum of the current values of the shift solenoids may exceed the guaranteed upper limit current value IMAX when the upper limit value Ilmt (1st) is supplied to the engagement solenoids. Therefore, it is necessary to reduce an excess amount of the current value by setting the current value for at least one disengagement solenoid to zero. However, when the current value is set to zero which is supplied to the disengagement solenoids of the disengagement-side friction engaging elements that are engaged in the second speed position which is the next gear position, the delay in the rise of the oil pressure and the deviation of the oil pressure occur when the gear position is shifted from the first speed position to the second speed position. Therefore, the disengagement solenoid of which the current value is set to zero is defined as the disengagement solenoid of the disengagement-side friction engaging element that is not engaged in the second speed position which is the next gear position.

Therefore, when the current gear position is the first speed position, the sum of the current values of the clutch solenoids 20 is suppressed to be equal to or less than the guaranteed upper limit current value IMAX, and occurrence of the delay in the rise of the oil pressure and the deviation of the oil pressure when the gear position is shifted from the first speed position to the second speed position can be prevented.

As described above, when the current gear position of the automatic transmission 3 is the reverse position, the current value is set to zero which is supplied to the disengagement solenoids of the disengagement-side friction engaging elements that are not engaged in the first speed position which is the next gear.

That is, in the reverse position where the allowable torque capacity is high, if the offset current value Imin is supplied to all of the disengagement solenoids, the sum of the current values of the shift solenoids may exceed the guaranteed upper limit current value IMAX when the upper limit value Ilmt (R) is supplied to the engagement solenoid. Therefore, it is necessary to reduce an excess amount of the current value by setting the current value for at least one disengagement solenoid to zero. However, when the current value is set to zero which is supplied to the disengagement solenoids of the disengagement-side friction engaging elements that are engaged in the first speed position which is the next gear position, the delay in the rise of the oil pressure and the deviation of the oil pressure occur when shifting from the reverse position to the first speed position. Therefore, the disengagement solenoid of which the current value is set to zero is defined as the disengagement solenoid of the disengagement-side friction engaging element that is not engaged in the first speed position which is the next gear position.

Therefore, when the current gear position is the reverse position, the sum of the current values of the clutch solenoids 20 is suppressed to be equal to or less than the guaranteed upper limit current value IMAX, and occurrence of the delay in the rise of the oil pressure and the deviation of the oil pressure when the gear position is shifted from the R range to the first speed position in the D range can be prevented.

As described above, when the gear position of the automatic transmission 3 is another gear position other than the first speed position and the reverse position, the offset current value Imin is supplied to all of the disengagement solenoids.

That is, in the second to ninth speed positions in the D range in which the allowable torque capacity is lower than that in the first speed position and that in the reverse position, when the offset current value Imin is supplied to all of the disengagement solenoids and the upper limit value Ilmt (2 to 9) is supplied to the engagement solenoids, the sum of the current values of the shift solenoids can be suppressed to be equal to or less than the guaranteed upper limit current value IMAX. Therefore, an amount of the offset current value Imin supplied to the three disengagement solenoids is absorbed by a uniform share of the three engagement solenoids, and the sum of the current values of the shift solenoids is set to the guaranteed upper limit current value IMAX.

Therefore, when the current gear position is one of the second to ninth speed positions in the D range, the solenoid disconnection diagnosis can be performed for all of the clutch solenoids 20 while the sum of the current values of the clutch solenoids 20 is suppressed to be equal to or less than the guaranteed upper limit current value IMAX. In addition, occurrence of the delay in the rise of the oil pressure and the deviation of the oil pressure during upshifting or downshifting in the second to ninth speed positions in the D range can be prevented.

[Operation of Solenoid Current Limit Control]

In the solenoid current limit control, a control is adopted in which, when the sum of the current value to be supplied to the engagement solenoids of the engagement-side friction engaging elements among the plurality of friction engaging elements exceeds a predetermined value, the offset current value Imin supplied to at least one of the disengagement solenoids is set to zero. At this time, the "predetermined value" is set to the value obtained by subtracting, from the guaranteed upper limit current value IMAX that guarantees the suppression of the temperature rise of the solenoid drive circuit, the total offset current ΣImin when the offset current value Imin is supplied to all of the disengagement solenoids.

That is, the setting of the "predetermined value," which is a threshold value for determining a magnitude of the sum of the current values to be supplied to the engagement solenoids, has a degree of freedom within a range in which the solenoid high load scene and the solenoid low load scene can be distinguished. On the other hand, the "predetermined value" is determined with reference to the guaranteed upper limit current value IMAX, and on an assumption that the offset current value Imin is supplied to all of the disengagement solenoids. Therefore, even when the control is to supply the offset current value Imin to all of the disengagement solenoids, the sum of the current values of the clutch solenoids 20 does not exceed the guaranteed upper limit current value IMAX. In addition, when the control is to set the current value to a part of the disengagement solenoids to zero, the sum of the current values of the clutch solenoids 20 does not exceed the guaranteed upper limit current value IMAX even when an amount of the offset current value, corresponding to the number of the disengagement solenoids for which the current value is set to zero, is added to the engagement solenoids.

Therefore, when the solenoid current limit control is performed, the control of supplying the offset current value Imin to all of the disengagement solenoids is allowed, and reduction in the service life of the solenoid caused by the temperature rise of the solenoid drive IC can be prevented.

In the solenoid current limit control of the first embodiment, the maximum instruction current value Imax to be supplied to the engagement solenoids during the in-gear state is limited to the upper limit value Ilmt based on the required engaging element pressure determined for each of the engagement-side friction engaging elements at each gear position.

For example, when the maximum instruction current value Imax to be supplied to the engagement solenoids during the in-gear state is set to the fixed current value Ifix that is based on the maximum engaging element pressure at all of the gear positions, the sum of the current values to be supplied to the engagement solenoids at all of the gear positions may exceed the "predetermined value". On the other hand, when the maximum instruction current value Imax is limited to the upper limit value Ilmt that is based on the required engaging element pressure determined for each of the engagement-side friction engaging elements at each gear position, the sum of the current values to be supplied to the engagement solenoids is less likely to exceed the "predetermined value," and the sum of the current values to be supplied to the engagement solenoids may be equal to or less than the "predetermined value" depending on the gear position.

Therefore, when the solenoid current limit control is performed, the number of disengagement solenoids for which the current value is set to zero can be minimized without decreasing, from a target capacity, a transmission torque capacity generated by the engagement of the engagement-side friction engaging elements.

In the solenoid current limit control of the first embodiment, when the current gear position is a gear position in which the sum ΣIlmt of the upper limit value Ilmt to be supplied to the engagement solenoids exceeds the predetermined value, the current value is set to zero which is supplied to, among the disengagement solenoids, the disengagement solenoids that are not engaged in the next gear position to which the gear position is shifted from the current gear position. When the current gear position is a gear position in which the sum ΣIlmt of the upper limit value Ilmt to be supplied to the engagement solenoids does not exceed the predetermined value, the offset current value Imin is supplied to all of the disengagement solenoids.

Therefore, when the current gear position is a gear position in which the sum ΣIlmt of the upper limit value Ilmt to be supplied to the engagement solenoids exceeds the predetermined value, the sum of the current values of the clutch solenoids 20 is suppressed to be equal to or less than the guaranteed upper limit current value IMAX, and a countermeasure against delay in the rise of the oil pressure is exerted. In addition, when the current gear position is a gear position in which the sum ΣIlmt of the upper limit value Ilmt to be supplied to the engagement solenoids is equal to or less than the predetermined value, the solenoid disconnection diagnosis function and the countermeasure against the delay in the rise of the oil pressure are exerted while the sum of the current values of the clutch solenoids 20 is suppressed to be equal to or less than the guaranteed upper limit current value IMAX.

As described above, the control device for the automatic transmission 3 of the first embodiment has the effects listed below.

(1) The control device for the automatic transmission 3 is provided with the transmission control unit 10 configured to control an engagement/disengagement state of each of a plurality of friction engaging elements in a gear train of the automatic transmission 3, so as to set a plurality of gear positions.

The transmission control unit 10 includes the solenoid management controller 110 configured to supply an offset current value Imin to disengagement solenoids of disengagement-side friction engaging elements among a plurality of shift solenoids (the clutch solenoids 20) that control respective shift oil pressures applied to the plurality of friction engaging elements.

The solenoid management controller 110 is configured to, when a sum of current values to be supplied to the plurality of shift solenoids (the clutch solenoids 20) exceeds a predetermined value, decrease a current value to be supplied to at least one of the disengagement solenoids that are supplied with the offset current value Imin to be lower than the offset current value Imin.

Therefore, a solenoid load of the transmission control unit 10 can be reduced while suppressing deterioration of the disconnection diagnosis function of the shift solenoids (the clutch solenoids 20) when the number of gear positions of the automatic transmission 3 is increased.

(2) The solenoid management controller 110 is configured to, when a sum of current values to be supplied to engagement solenoids of engagement-side friction engaging elements among the plurality of friction engaging elements exceeds a predetermined value, decrease the offset current value Imin to be supplied to at least one of the disengagement solenoids to be lower than the offset current value Imin to be supplied to other disengagement solenoids.

Therefore, when the sum of the current values to be supplied to the engagement solenoids of the engagement-side friction engaging elements exceeds the predetermined value, the solenoid load of the transmission control unit 10 can be reduced while suppressing the deterioration of the disconnection diagnosis function of the shift solenoids (the clutch solenoids 20).

(3) The solenoid management controller 110 is configured to, when the sum of the current values to be supplied to the engagement solenoids of the engagement-side friction engaging elements to be engaged in a current gear position exceeds the predetermined value, decrease the offset current value Imin to be supplied to, among the disengagement solenoids, a disengagement solenoid that is not engaged in a next gear position to which the gear position is shifted from the current gear position.

Therefore, not only the deterioration of the disconnection diagnosis function of the shift solenoids (the clutch solenoids 20) can be suppressed but also the solenoid load of the transmission control unit 10 can both be reduced.

(4) The solenoid management controller 110 is configured to set the current value to zero when to decrease the offset current value Imin to be supplied to the disengagement solenoid.

Therefore, the solenoid load of the transmission control unit 10 can be effectively reduced.

(5) The solenoid management controller 110 is configured to set the predetermined value to a value obtained by subtracting, from a guaranteed upper limit current value IMAX that guarantees suppression of a temperature rise of a solenoid drive circuit, a total offset current ΣImin when the offset current value Imin is supplied to all of the disengagement solenoids.

Therefore, when the solenoid current limit control is performed, the control of supplying the offset current value Imin to all of the disengagement solenoids is allowed, and reduction in a service life of the solenoid caused by the temperature rise of the solenoid drive circuit can be prevented.

(6) The solenoid management controller 110 is configured to limit a maximum instruction current value Imax to be supplied to the engagement solenoids during an in-gear state to an upper limit value Ilmt that is based on a required engaging element pressure determined for each of the engagement-side friction engaging elements at each gear position.

Therefore, when the solenoid current limit control is performed, the number of disengagement solenoids for which the current value is set to zero can be minimized without decreasing, from a target capacity, a transmission torque capacity generated by the engagement of the engagement-side friction engaging elements.

(7) The solenoid management controller 110 is configured to:

when a current gear position is a gear position in which a sum ΣIlmt of the upper limit value Ilmt to be supplied to the engagement solenoids exceeds the predetermined value, set the current value to zero which is supplied to, among the disengagement solenoids, a disengagement solenoid that is not engaged in a next gear position to which the gear position is shifted from the current gear position, and when the current gear position is a gear position in which the sum ΣIlmt of the upper limit value Ilmt to be supplied to the engagement solenoid does not exceed the predetermined value, supply the offset current value Imin to all of the disengagement solenoids.

Therefore, when the current gear position is a gear position in which the sum ΣIlmt of the upper limit value Ilmt to be supplied to the engagement solenoids exceeds the predetermined value, the sum of the current values of the shift solenoids (the clutch solenoids 20) can be suppressed to be equal to or less than the guaranteed upper limit current value IMAX and a countermeasure against delay in the rise of the oil pressure can be exerted. In addition, when the current gear position is a gear position in which the sum $\Sigma$Ilmt of the upper limit value Ilmt to be supplied to the engagement solenoids is equal to or less than the predetermined value, the solenoid disconnection diagnosis function and the countermeasure against the delay in the rise of the oil pressure can be exerted while the sum of the current values of the shift solenoids (the clutch solenoids 20) is suppressed to be equal to or less than the guaranteed upper limit current value IMAX.

(8) The solenoid management controller 110 is configured to, when the current gear position of the automatic transmission 3 is the first speed position, set the current value to zero which is supplied to a disengagement solenoid of a disengagement-side friction engaging element that is not engaged in a second speed position which is the next gear position.

Therefore, when the current gear position is the first speed position, the sum of the current values of the shift solenoids (the clutch solenoids 20) is suppressed to be equal to or less than the guaranteed upper limit current value IMAX, and occurrence of the delay in the rise of the oil pressure and the deviation of the oil pressure when the gear position is shifted from the first speed position to the second speed position can be prevented.

(9) The solenoid management controller 110 is configured to, when the current gear position of the automatic transmission 3 is a reverse position, set the current value to zero which is supplied to a disengagement solenoid of a disengagement-side friction engaging element that is not engaged in a first speed position which is the next gear position.

Therefore, when the current gear position is the first speed position, the sum of the current values of the shift solenoids (the clutch solenoids 20) is suppressed to be equal to or less than the guaranteed upper limit current value IMAX, and occurrence of the delay in the rise of the oil pressure and the deviation of the oil pressure when the gear position is shifted from the R range to the D-range first speed position can be prevented.

(10) The solenoid management controller 110 is configured to, when the gear position of the automatic transmission 3 is another gear position other than the first speed position and the reverse position, supply the offset current value Imin to all of the disengagement solenoids.

Therefore, when the current gear position is another gear position other than the first speed position and the reverse position (the second to ninth speed positions in the D range), the sum of the current values of the shift solenoids (the clutch solenoids 20) is suppressed to be equal to or less than the guaranteed upper limit current value IMAX, and the solenoid disconnection diagnosis can be performed for all of the shift solenoids. In addition, occurrence of the delay in the rise of the oil pressure and the deviation of the oil pressure during upshifting or downshifting in another gear position other than the first speed position and the reverse position (the second to ninth speed positions in the D range) can be prevented.

Hereinafter, the control device for the automatic transmission according to the embodiment of the invention will be described with reference to the first embodiment. However, a specific configuration is not limited to that of the first embodiment, and a change, an addition, and the like in design are allowed as long as the configuration does not depart from a gist of an invention according to each claim in the scope of claims.

The first embodiment shows an example of the solenoid management controller 110 in which the predetermined value, which is a threshold value for determining a magnitude of the sum of the current values to be supplied to the engagement solenoids, is determined based on the guaranteed upper limit current value IMAX that guarantees suppression of the temperature rise of the solenoid drive circuit. However, the solenoid management controller may determine the predetermined value based on a target upper limit current value different from the guaranteed upper limit current value or a target upper limit current value including a part of the guaranteed upper limit current value. Further, a load fluctuation state of the shift solenoid and a temperature of the solenoid drive circuit may be monitored, and the predetermined value may be determined by a variable value according to a magnitude of the load and the circuit temperature.

The first embodiment shows an example in which the current value supplied to the disengagement solenoids of the disengagement-side friction engaging elements is set to zero. However, the current value supplied to the disengagement solenoids does not have to be set to zero as long as the current value to be supplied to the disengagement solenoids of the disengagement-side friction engaging elements is decreased to be lower than other offset current values, and the current to be supplied to the shift solenoids is decreased as a whole.

The first embodiment shows an example in which the offset current value is set to zero when the sum of the current values to be supplied to the engagement solenoids of the engagement-side friction engaging elements exceeds the predetermined value. However, the present disclosure is not limited to the sum of the current values to be supplied to the engagement solenoids of the engagement-side friction engaging elements, and the offset current value may be decreased when a total sum of current values to be supplied to the shift solenoids, including the offset current values to be supplied to the disengagement solenoids of the disengagement-side friction engaging elements, exceeds a predetermined value.

The first embodiment shows, as an automatic transmission, the automatic transmission 3 having nine forward speeds and one reverse speed. However, the automatic transmission may be a stepped automatic transmission having gear positions other than the nine forward speeds and one reverse speed, or a continuously variable transmission with a sub-transmission in which a belt continuously variable transmission and a stepped transmission are combined.

The first embodiment shows a control device for the automatic transmission to be mounted on an engine vehicle. However, the present disclosure is not limited to the engine vehicle, and the control device can also be applied as a control device for an automatic transmission to be mounted on such as a hybrid vehicle and an electric vehicle.

The present application claims a priority under Japanese Patent Application No. 2019-185706 filed to Japan Patent Office on Oct. 9, 2019, and an entire content of this application are incorporated herein by reference.

The invention claimed is:

1. A control device for an automatic transmission, the control device controlling an engagement/disengagement state of each of a plurality of friction engaging elements, so as to set a plurality of gear positions, wherein
the control device is configured to:
supply an offset current value to disengagement solenoids of disengagement-side friction engaging elements among a plurality of shift solenoids that control respective shift oil pressures applied to the plurality of friction engaging elements, and when a current gear position is a first speed position or a reverse position, decrease a current value to be supplied to at least one of the disengagement solenoids that are supplied with the offset current value to be lower than the offset current value.

2. The control device for the automatic transmission according to claim 1, wherein the control device is further configured to:

when the current gear position is the first speed position or the reverse position, decrease the current value to be supplied to the at least one of the disengagement solenoids to a value lower than the offset current value to be supplied to the other disengagement solenoids.

3. The control device for the automatic transmission according to claim 2, wherein the control device is further configured to:

when the current gear position is the first speed position or the reverse position, decrease the current value to be supplied to, among the disengagement solenoids, a disengagement solenoid that is not engaged in a next gear position to which the gear position is shifted from the current gear position.

4. The control device for the automatic transmission according to claim 1, wherein the control device is further configured to:

set the current value to zero when the current value to be supplied to the at least one of the disengagement solenoids is decreased.

5. The control device for the automatic transmission according to claim 1, wherein the control device is further configured to:

when the current gear position is the first speed position or the reverse position, set the current value to zero which is supplied to, among the disengagement solenoids, a disengagement solenoid that is not engaged in a next gear position to which the gear position is shifted from the current gear position, and when the current gear position is another gear position other than the first speed position and the reverse position, supply the offset current value to all of the disengagement solenoids.

6. The control device for the automatic transmission according to claim 5, wherein the control device is further configured to:

when the current gear position is the first speed position, set the current value to zero which is supplied to a disengagement solenoid of a disengagement-side friction engaging element that is not engaged in a second speed position which is the next gear position.

7. The control device for the automatic transmission according to claim 5, wherein the control device is further configured to:

when the current gear position is the reverse position, set the current value to zero which is supplied to a disengagement solenoid of a disengagement-side friction engaging element that is not engaged in the first speed position which is the next gear position.

8. A control method for an automatic transmission, the control method being for controlling an engagement/disengagement state of each of a plurality of friction engaging elements so as to set a plurality of gear positions, the control method comprising:

supplying an offset current value to disengagement solenoids of disengagement-side friction engaging elements among a plurality of shift solenoids that control respective shift oil pressures applied to the plurality of friction engaging elements; and decreasing, when a current gear position is a first speed position or a reverse position, a current value to be supplied to at least one of the disengagement solenoids that are supplied with the offset current value to be lower than the offset current value.

9. A non-transitory computer-readable medium storing a program executable by a computer for an automatic transmission, the computer controlling an engagement/disengagement state of each of a plurality of friction engaging elements, so as to set a plurality of gear positions, the program causing the computer to execute:

supplying an offset current value to disengagement solenoids of disengagement-side friction engaging elements among a plurality of shift solenoids that control respective shift oil pressures applied to the plurality of friction engaging elements, and when a current gear position is a first speed position or a reverse position, decreasing a current value to be supplied to at least one of the disengagement solenoids that are supplied with the offset current value to be lower than the offset current value.

* * * * *